(12) United States Patent
Galimberti et al.

(10) Patent No.: US 9,251,155 B1
(45) Date of Patent: Feb. 2, 2016

(54) MAINTAINING SORT ORDER OF DATA IN DATABASES

(71) Applicant: ParAccel, Inc., Campbell, CA (US)

(72) Inventors: David Benedict Galimberti, Ann Arbor, MI (US); Brian Pak-ning Chu, San Diego, CA (US)

(73) Assignee: ParAccel LLC, Campbell, CA (US)

( * ) Notice: Subject to any disclaimer, the term of this patent is extended or adjusted under 35 U.S.C. 154(b) by 288 days.

(21) Appl. No.: 13/835,892

(22) Filed: Mar. 15, 2013

Related U.S. Application Data (60) Provisional application No. 61/643,074, filed on May 4, 2012.

(51) Int. Cl.
*G06F 17/30* (2006.01)

(52) U.S. Cl.
CPC .... *G06F 17/30091* (2013.01); *G06F 17/30292* (2013.01); *G06F 17/30315* (2013.01)

(58) Field of Classification Search
CPC ............... G06F 17/30091; G06F 17/30315; G06F 17/30292; G06F 7/36
USPC .......................... 707/807, 752, 753, 803, 756
See application file for complete search history.

(56) References Cited

U.S. PATENT DOCUMENTS

| | | | | |
|---|---|---|---|---|
| 5,367,675 | A * | 11/1994 | Cheng et al. | 707/999.002 |
| 7,263,536 | B1 * | 8/2007 | Pederson | 707/999.203 |
| 8,074,219 | B2 * | 12/2011 | Duffy et al. | 707/696 |
| 2009/0007137 | A1 * | 1/2009 | Duffy et al. | 718/108 |
| 2010/0235335 | A1 * | 9/2010 | Heman et al. | 707/769 |
| 2012/0330979 | A1 * | 12/2012 | Elson et al. | 707/752 |

\* cited by examiner

*Primary Examiner* — Vincent F Boccio
(74) *Attorney, Agent, or Firm* — Fenwick & West LLP (57) ABSTRACT

A database system maintains table data in sorted order. The table data becomes unsorted over time due to add, delete, and update operations. These operations are performed such that the table comprises an initial sorted region followed by an unsorted region. The database system performs an incremental operation to rewrite the table in sorted order. The database system partitions the unsorted region into a plurality of partitions comprising sorted rows within each partition. The database system iteratively merges rows from the partitions to the sorted region of the table. The database system selects a set of lowest tanked rows from the partitions. The database system merges these lowest ranked rows with the sorted region while maintaining the sort order of the sorted region. The database system repeats these steps until all the partitions are processed. The database may store data in columnar fashion.

13 Claims, 9 Drawing Sheets

MAINTAINING SORT ORDER OF DATA IN DATABASES

CROSS REFERENCE TO RELATED APPLICATION

This application claims the benefit of U.S. Provisional Patent Application 61/643,074, entitled "Maintaining Sort Order of Data in Databases," filed on May 4, 2012, which is incorporated by reference in its entirety.

BACKGROUND

This invention relates in general to databases and in particular to maintaining tables of databases in sorted order.

Relational databases store information as tables or relations. For example, in a database schema describing an organization, one relation may store information describing employees and another relation may store information describing departments. Each row of the department relation may represent a department and each row of the employee relation may represent an employee. Databases provide query language interfaces for users to access data stored in databases. An example query language interface typically supported by databases is the structured query language (SQL). The query languages allow users to perform various operations to extract desired set of results from tables stored in database. For example, a user can join two tables, return a subset of columns of one or more tables, perform aggregate operations, and so on.

Processing database queries often requires sorting of a data. Databases perform sort operation on tables as well as intermediate results while processing queries. The efficiency of the sort operation affects performance of several queries. If a database performs sorting inefficiently, queries using sorted data also perform inefficiently. Some databases store table data in sorted form on persistent storage so that the data is ready for use while processing queries. However, databases often perform modify data stored in tables, thereby changing the values stored in the tables. As a result, a sorted table over time becomes unsorted. If the stored data becomes unsorted, the database needs to perform sort the data while processing queries resulting in inefficient processing of queries.

SUMMARY

Embodiments allow database systems to maintain sort order of tables for improving performance of database queries that use the data in sorted order. A table that is initially stored in sorted order gets modified over time resulting in the table being stored as a sorted region followed by an unsorted region. The database system partitions the unsorted region into a plurality of partitions, each partition storing data sorted within the partition. The database system selects a set of rows from the partitions that are the lowest ranked rows in the sort order across all the partitions. The database system merges the selected set of rows with the rows from the sorted region. The merged set of rows is stored in sorted order. The database system repeats the process of selecting rows from the partitions and merging the selected rows in the sorted region while there are unprocessed rows in the partitions. After all the rows of the partition are processed, the merged sorted region includes all the rows of the input table in sorted order.

In an embodiment, the input table is stored in a columnar fashion. The data of the columns may be stored in compressed form. The same set of rows may result in different number of blocks for each column due to differences in compression of each column. Accordingly, the database system identifies data following a row by identifying blocks corresponding to each column storing data from the row. The data remaining in the each column is copied to a new block corresponding to each column and is processed with the next set of rows that is merged.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments maintain data in the tables of a database in sorted order. The criteria for sorting the rows is determined by the typical pattern of usage of the table in database queries. For example, the rows may be sorted according to a particular key or set of keys. Maintaining the data in sorted order improves the performance of analytic queries that need to sort the data. If the data is not stored in sorted order, the data is sorted at query processing time, thereby slowing down the queries.

When a table is loaded into the database the data of the table is sorted. However, as changes are made to the data stored in the tables, for example, by adding new rows, updating rows or deleting rows, the data set of the table doesn't remain sorted. In an embodiment, new rows inserted in the table are added at the end of the table. Since these inserts may be performed in an arbitrary order, this data at the end of the table is unsorted. Updates to the data in the table are performed by deleting the row that is updated and adding a row at the end. As a result, as rows are updated and new rows are added, the table that was initially sorted is modified into a table that has rows marked as deleted rows and an unsorted region of rows at the end of the table. Since the data of the table is not entirely sorted, the performance of certain queries is not as fast as their performance on a sorted table. Therefore, embodiments ensure that the table data is maintained such that the deleted rows are removed and the rows of the table get resorted. Deletes to the rows of the table are performed by marking the storage space used by the row in the table as unused area. However, the storage space of a deleted row is not used by subsequent operations on the tables.

The tables can be sorted periodically by copying the data to a new table, dropping all rows that were deleted while copying thereby purging them, and sorting the data of the new table. The new table replaces the original table and the original table is dropped. However, this strategy requires additional space to execute since the entire table is copied. If the original table is very large the additional space required to run this process is also equally large. Furthermore, this strategy requires putting the system in maintenance mode while the data is being copied and sorted. During maintenance mode, queries may not be executed on the table. The process of managing tables of the database is called vacuuming the table.

Embodiments maintain sort order of the tables without requiring the table to be put in a maintenance mode for extended periods of time during which the table cannot be used. Embodiments also maintain the sort order with less space compared to a process that copies the entire table. Embodiments let the user specify a size of a vacuum buffer to be used in the vacuum process. Accordingly, the additional disk space that is used by the vacuum process is limited by the user specified parameter, independent of the size of the original table.

The vacuum process is performed in an incremental fashion such that only a partial vacuum is performed that can be managed using the given size of vacuum buffer. Furthermore, the data copied in the vacuum buffer is merged back to the original table. This merge step is relatively efficient and the table is unusable for much less time compared to the technique described above. Furthermore, only a portion of the table that is being merged is locked instead of the entire table.

Overall System Environment

Figure 1:
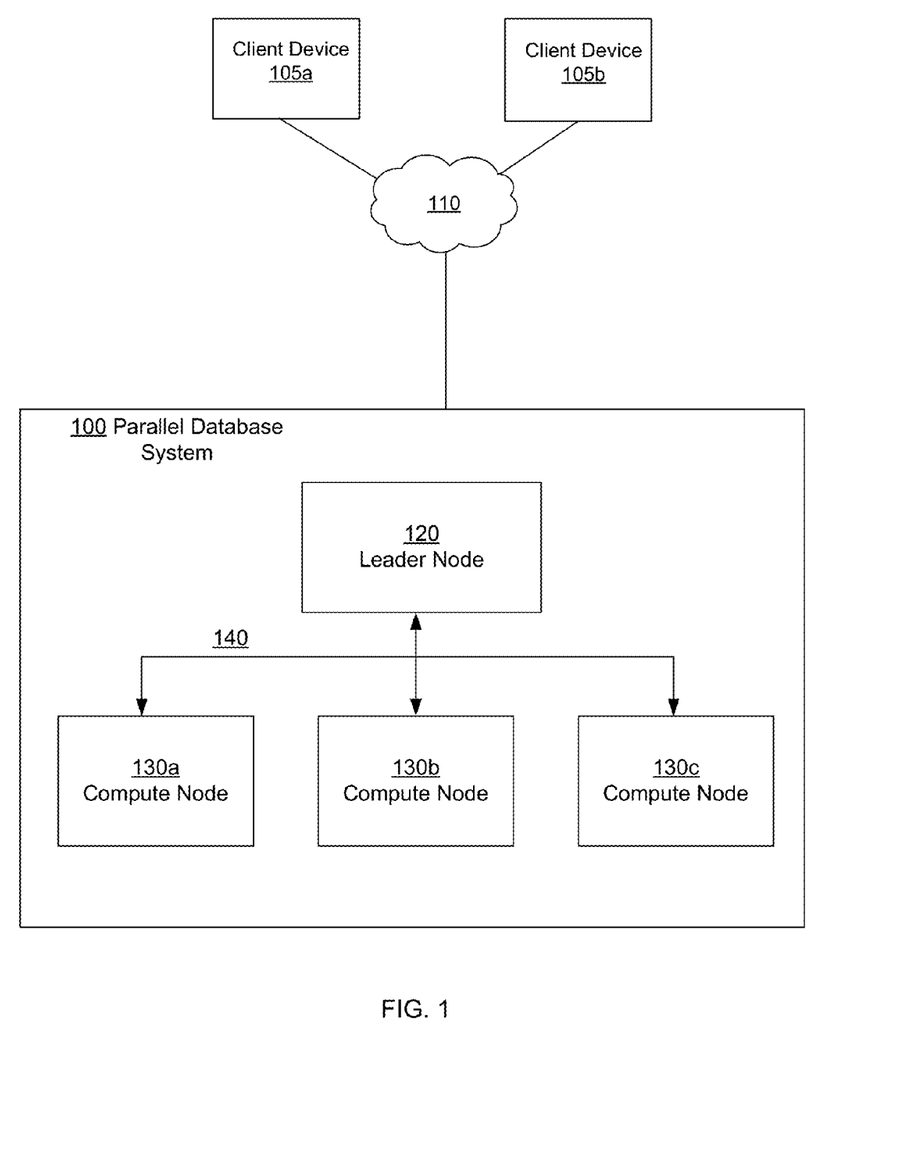
FIG. 1 describes a configuration of a parallel database system for performing the processes described herein, in accordance with an embodiment of the invention.

FIG. 1 shows the overall system environment illustrating the architecture of a parallel database system 100, in accordance with an embodiment of the invention. Note that the techniques described herein are however applicable to other types of database systems, for example, databases that execute on a single processor architecture or other types of architectures. At the highest level, the parallel database system 100 has four main architectural components: The leader node 120, the compute nodes 130, and the parallel communication fabric 140. (A letter after a reference numeral, such as "130a," indicates that the text refers specifically to the element having that particular reference numeral, while a reference numeral in the text without a following letter, such as "130," refers to any or all of the elements in the figures bearing that reference numeral.)

The leader node controls the execution of the compute nodes, and all nodes communicate with each other via the fabric. For example, leader and compute nodes can be standard x86 servers running Linux. Users and applications may communicate with the system via the leader node by using standard interfaces—ANSI SQL via ODBC/JDBC.

The leader node may be on the network and is intended to interface with external applications and the rest of the computers on a network. The leader node communicates with applications and users via standard ODBC or JDBC, and recognizes ANSI SQL plus database extensions. The leader node manages communication with the compute nodes. The leader node is responsible for controlling sessions, parsing and optimizing queries, and scheduling execution of the workload, but the leader may or may not participate in data operations. Architectural workload separation by node type (leader nodes and compute nodes) allows for better throughput optimization—the leader's bandwidth is optimized for outward communication and handling of query overhead so each compute node's bandwidth is dedicated to data operations Compute nodes are the high level component responsible for processing and storing data. Each node stores and manages a subset of the rows of each table. For example, if a table has 1 billion rows and there are 20 compute nodes, then about 50 million rows are distributed to each node. Data may be distributed to a particular node based on a hashing algorithm applied to a distribution key, or by round robin. Distribution keys, such as the primary key or other popular join column, are good for even distribution of data, especially when queries will benefit from collocated joins by using the same distribution key. In cases where an inherently balanced distribution key isn't obvious or doesn't exist, round robin distribution may be used to balance the data.

By offering multiple methods of data distribution, it is possible to maintain the appropriate balance between data distribution and performance so a parallel database can take best advantage of its resources and provide good parallel efficiency. The parallel database performance is driven by how many compute nodes are present. For example, with an application, a 50-compute node system may perform 5× faster than a 10-compute node system.

Compute nodes are logically subdivided into a set of parallel processes called "slices" that include a CPU core, an allocation of memory and portion of each disk. Slices work in parallel regardless of the work they are processing. When loading, slices parse the data into columns, then sort, compress and write the data to disk. Slices communicate with other slices via the fabric, but they are not directly accessed by end user applications. In certain contexts, a slice refers to the portion of data that is allocated to a process (or core) for processing.

In an embodiment, the communication fabric is a high performance fabric based on standard, ubiquitous, Gigabit Ethernet (GbE) and standard multi-port switches that have full crossbar support. The communication fabric may use a custom protocol to enable highly efficient communication among each of the nodes (leader and compute). It delivers maximum interconnect performance because it is specifically designed for how traffic moves in a complex, parallel database environment (e.g., large intermediate result sets, data redistribution) and therefore uses multiple links simultaneously running multiple data streams. The fabric is implemented internally as multiple independent networks all working on behalf of the database, and while two GbE fabrics may be used for high availability, the parallel database can utilize as many fabrics as are available for increased performance.

Client devices 105 are computing devices that execute client software, e.g., a web browser 130 or built-in client application, to interact with the mapping system 100 via a network. Note that the terms "client" or "client device," as used herein may refer to software providing respective functionality, to hardware on which the software executes, or to the entities operating the software and/or hardware, as is apparent from the context in which the terms are used. In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc.

The interactions between the client devices 105 and the system 100 are typically performed via a network 110, for example, via the internet. The network 110 enables communications between the client device 105 and the system 100. In another embodiment, the entities can use custom and/or dedicated data communications technologies instead of, or in addition to, the ones described above. Depending upon the embodiment, the network 110 can also include links to other networks such as the Internet. The following section describes various embodiments of the vacuum process.

If the database system is a parallel database system a table being vacuumed may be distributed across multiple nodes of a parallel or distributed machine. A portion of the table processed by a node of the parallel system is called a slice. The vacuum process is performed in parallel by each node on a per slice basis. Although the system environment is described herein for a parallel architecture, embodiments can be implemented on any type of architecture including single processor architectures.

System Architecture

Figure 2:
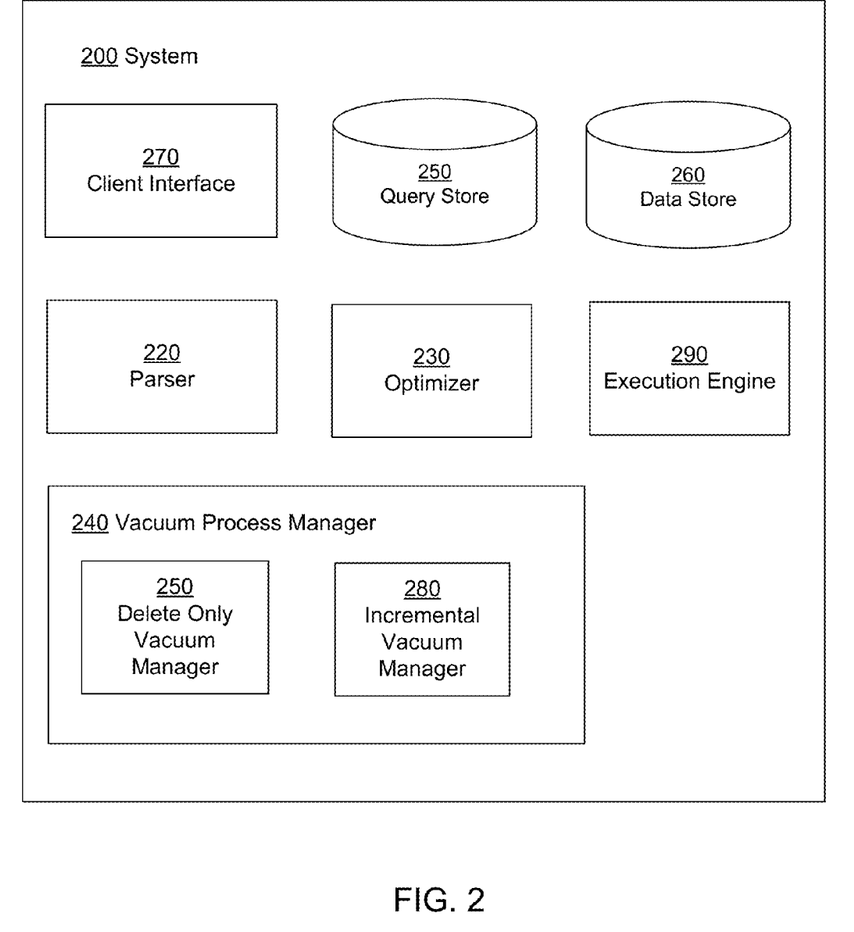
FIG. 2 describes various components of a system configured to maintain sort order in databases in accordance with an embodiment of the invention.

FIG. 2 describes various components of a system configured to process user defined functions in accordance with an embodiment of the invention. The system 200 may describe the system architecture of a leader node 120 or a compute node 130. The system 200 includes a client interface 270, a parser 220, an optimizer 230, a query store 250, an execution engine 290, a vacuum process manager 240, and a data store 260. The system 200 is also referred to herein as a database system 200. In some embodiments, the system 200 is a parallel database system that executes database queries using multiple processors. In some embodiments, the system 200 may include additional, fewer, or different modules for various applications. Conventional components such as network interfaces, security mechanisms, load balancers, failover servers, management and network operations consoles, and the like are not shown so as to not obscure the details of the system.

The data store 260 stores data comprising information including user data and metadata describing the database. In an embodiment, the data store 260 is represented as a relational database but can be represented as any other form of data store. User data stored in the data store 260 comprises application specific information, for example, tables storing data describing employees, customers, sales, and so on. The data store 260 also stores metadata, for example, information describing various configuration parameters of the database, structure of the different schemas and tables of the database and so on.

In an embodiment, the system 200 provides an interface to allow the users to access the data stored in the data store 260, for example, a structured query language (SQL) interface. The query store stores queries defined by the user that are executed in response to user requests. In an embodiment, the queries are received from the client device and executed on the fly. The parser 220 analyzes the syntax of information represented as a language.

The optimizer 230 optimizes execution of the database queries. The optimizer 230 may rewrite the queries such that the rewritten query executes more efficiently. The optimizations disclosed include the optimization described herein, for example, generation of reusable queries, aggregate view composition, and so on.

The execution engine 290 executes the database queries. Typically, the optimizer performs optimizations to input queries and the execution engine 290 executes the optimized queries. The result of the executed queries is returned by the system 200 to the client that sent the queries. The client interface 270 provides the libraries that interact with the client devices 105 and allows the client devices to access the data stored in the system 200.

The vacuum process manager 240 manages the vacuum process for rearranging data of a table after several modifications to the data have been made. The vacuum process manager 240 comprises a delete only vacuum manager 250 and an incremental vacuum manager 280. Further details of the vacuum manager 250 and an incremental vacuum manager 280 are provided herein.

Incremental Delete Only Vacuum Process

The delete only vacuum manager 250 executes a delete only vacuum process that allows the deleted rows of the table to be eliminated to organize the table in a sorted order. The delete only vacuum manager 250 reorganizes the table in sorted order without performing the sorting of the entire table. The delete-only vacuum can be considered functionally identical to an incremental vacuum without a sort and merge. Delete-only vacuum, processes as many rows as possible until it consumes the allocated disk space.

Delete-only vacuum uses the row address to identify which rows in the original blocks (both deleted and undeleted) were vacuumed thus far and therefore which blocks to replace. Delete-only vacuum simply scans the row address and supplies the row address as an argument to a block replacement function.

In embodiments where the database is a columnar database, each column stores its values independently. As a result, given a set of consecutive rows, the blocks storing the first and last row may contain values from rows not in that set. For example, the block containing the first row of the set includes rows that appear before the first row in the sort order. Similarly, the block containing the last row of the set includes rows of the table that appear after the last row of the set in the sort order. The vacuum process preserves any untouched values in the blocks that are replaced. An incremental vacuum process may move the untouched values elsewhere beforehand because it identifies the rows to vacuum a priori. Delete-only vacuum, on the other hand, recompresses the untouched values of each column at some future stopping point.

Figure 3:
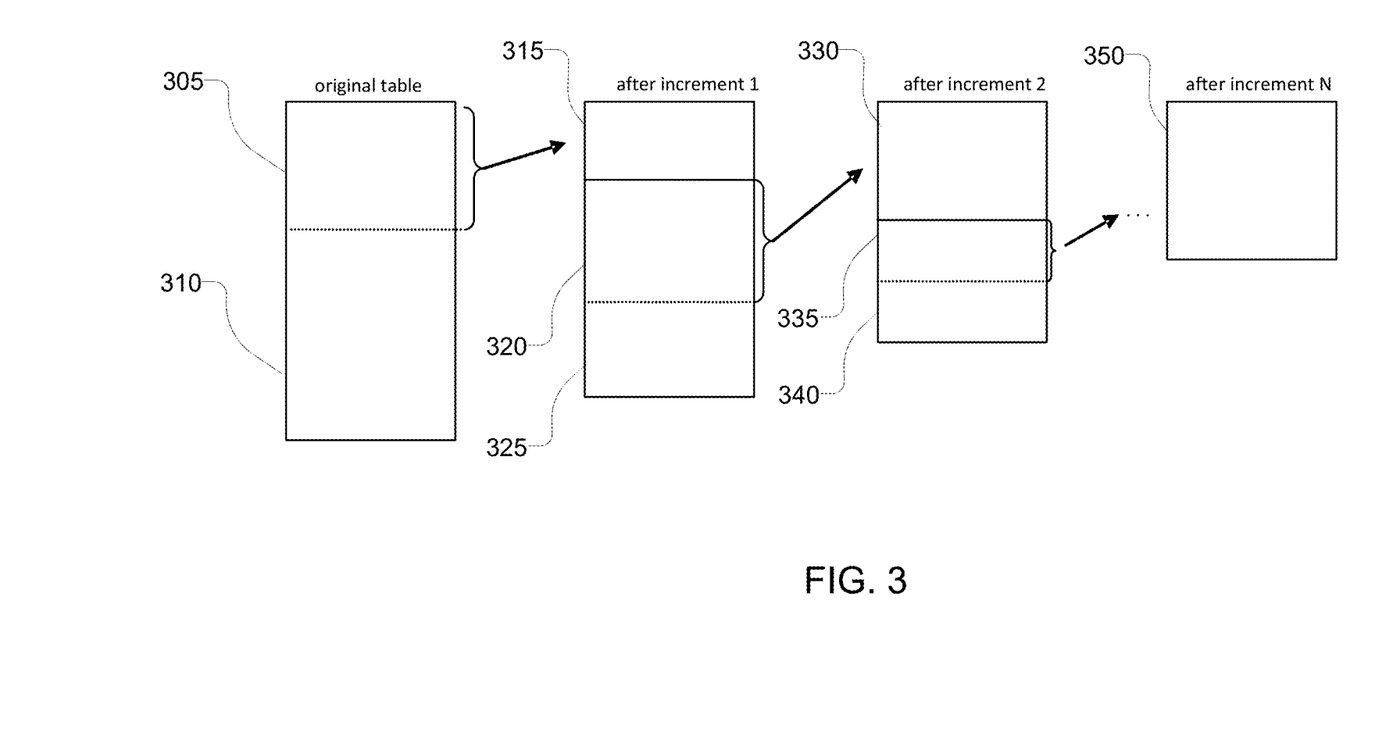
FIG. 3 shows an example illustrating the process of delete only vacuum, in accordance with an embodiment.

FIG. 3 shows an example illustrating the process of delete only vacuum, in accordance with an embodiment. The original table that is input to the process. A portion 305 of the table is processed in an iteration resulting in the deleted rows of the portion being dropped and the portion being compressed to region 315. The remaining portion 310 of the table is processed in subsequent iterations. The portion 320 is processed in the next iteration resulting in generation of portion 330 obtained by a combination of the region 315 and the processing of the region 320. This process is continued until the entire table is processed, resulting in region 350 that covers the entire table. The output table is sorted and contains the data of the input table such that the deleted rows of the input table are removed and the output table occupies less storage as a result.

Figure 4:
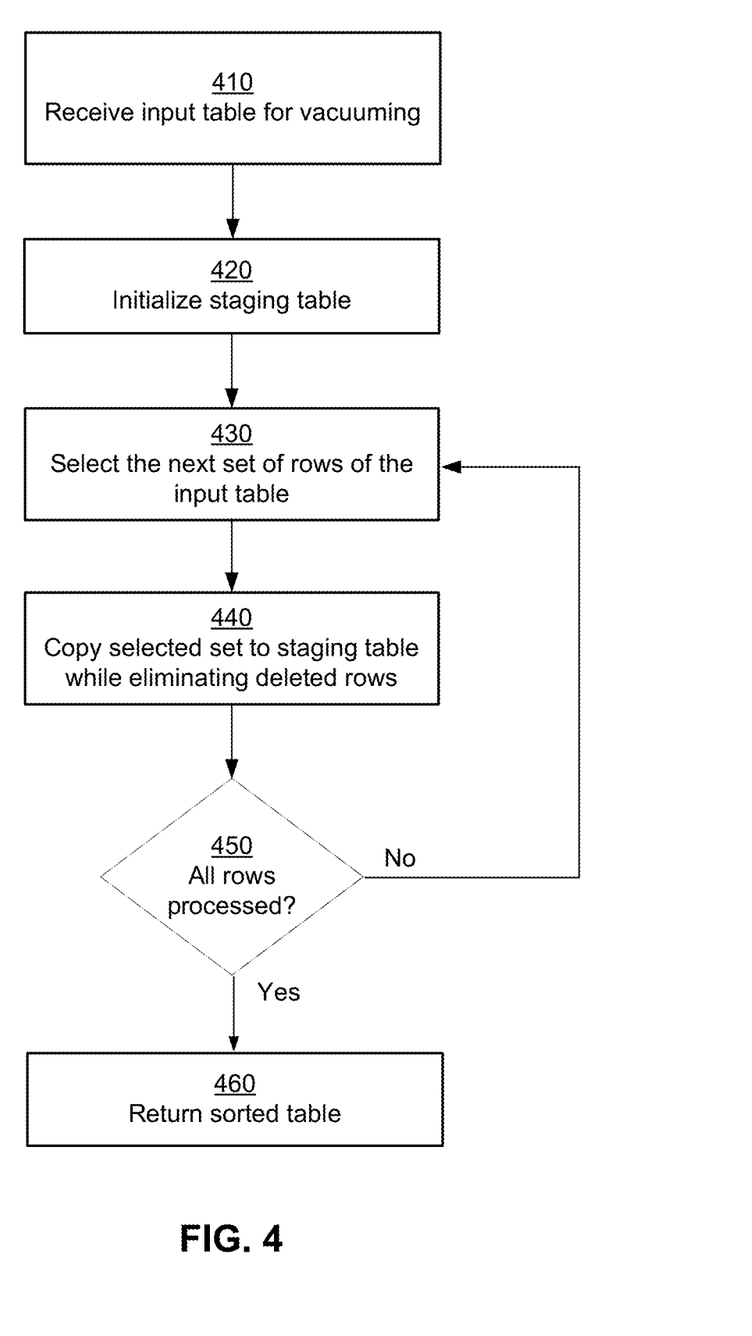
FIG. 4 shows a flowchart illustrating the process of delete only vacuum, in accordance with an embodiment.

FIG. 4 shows a flowchart illustrating the process of delete only vacuum, in accordance with an embodiment. The delete only vacuum manager 250 receives the input table for processing. The input table is a previously sorted table from which one or more rows have been deleted. The delete only vacuum manager 250 initializes a staging table to store output results as the delete only vacuum process progresses.

The delete only vacuum manager 250 selects 430 sets of rows from the input table and processes them. The first set of rows processed may comprise the first N rows of the input table. The next set of rows is a set of rows in the input table that occurs consecutively after the first set of rows in the order of the rows of the input table. Similarly, each set of rows is the set of rows that occurs consecutively after the previous set of rows in the order of the rows of the input table.

The delete only vacuum manager 250 takes the selected set of rows and copies 440 the data to the staging table. As the selected set of rows is copied to the staging table, the deleted rows of the input table are eliminated. In other words, the storage space corresponding to the deleted rows that was marked as unused as a result of the delete operation is ignored during the copying of the data. Each set of rows from the input table is appended at the end of the previous set of rows copied to the staging table. The delete only vacuum manager 250 checks 450 if all the rows are processed. If all rows of the input table have not been processed the steps 430, 440, and 450 are repeated. If all rows of the input table are processed, the delete only vacuum manager 250 returns the staging table as the output result of the delete only vacuum process.

In an embodiment, the delete only vacuum manager 250 determines the count of the number of rows unprocessed in the input table using the count(*) operation. The delete only vacuum process is completed when the count(*) of the unprocessed rows of the input table is reduced to zero. The delete only vacuum manager 250 also tracks the last processed row from the input table. This allows the delete only vacuum manager 250 to determine where to select the next set of rows for processing. In an embodiment, the delete only vacuum manager 250 performs a commit operation after writing the selected set of rows to the staging table after each iteration. The commit operation allows the process to restart where it left off in case the process is interrupted due to error or cancelled by the user.

Incremental Vacuum Process

The incremental vacuum manager 280 performs an incremental vacuum process to sort a table on which delete, add, and update operations have been performed. The delete operations are performed by leaving the persistent storage assigned to the deleted row as empty. In other words, once the row is deleted in the table, that portion of the persistent storage is not filled with new rows of the table. These unused portions of the table are also referred to as holes. Any new rows added to the table are added at the end of the table. Furthermore, updates are performed by deleting the row being updated and adding a new row corresponding to the updated row at the end of the table.

As a result, the table after a set of add, delete, and update operations gets modified such that it has a sorted region in the beginning of the table and an unsorted region at the end of the table. The sorted region is also referred to herein as the first region and the unsorted region is referred to as the second region of the input table. The size of the unsorted region may keep increasing as the modifications are performed to the table. The incremental vacuum manager 280 performs the incremental vacuum process that copies the data of the table to a new region of the persistent storage such that the copied data is in sorted order and without any holes or unused spaces corresponding to the deleted rows.

Attempting to perform the entire sort of the second region in one step may require significant amount of space. The amount of space required for sorting depends on the size of the data set of the unsorted region that is being sorted. The available memory of the database system may not be large enough to perform sorting of the data in memory. In other words, the data may not fit in the vacuum buffer for purposes of sorting based on the size specified by the user. Accordingly, embodiments perform the sort of the second region in an incremental fashion.

Embodiments perform partial sorts of the second region so as to extract only a small number of sorted rows and merge those with the first region. In an embodiment, the second region is divided into multiple partitions such that each partition is sorted within itself. The incremental merge determines a merge increment as the process performs merging instead of a priori. The incremental merge may use the same compression/recompression techniques as both delete only vacuum.

Figure 5:
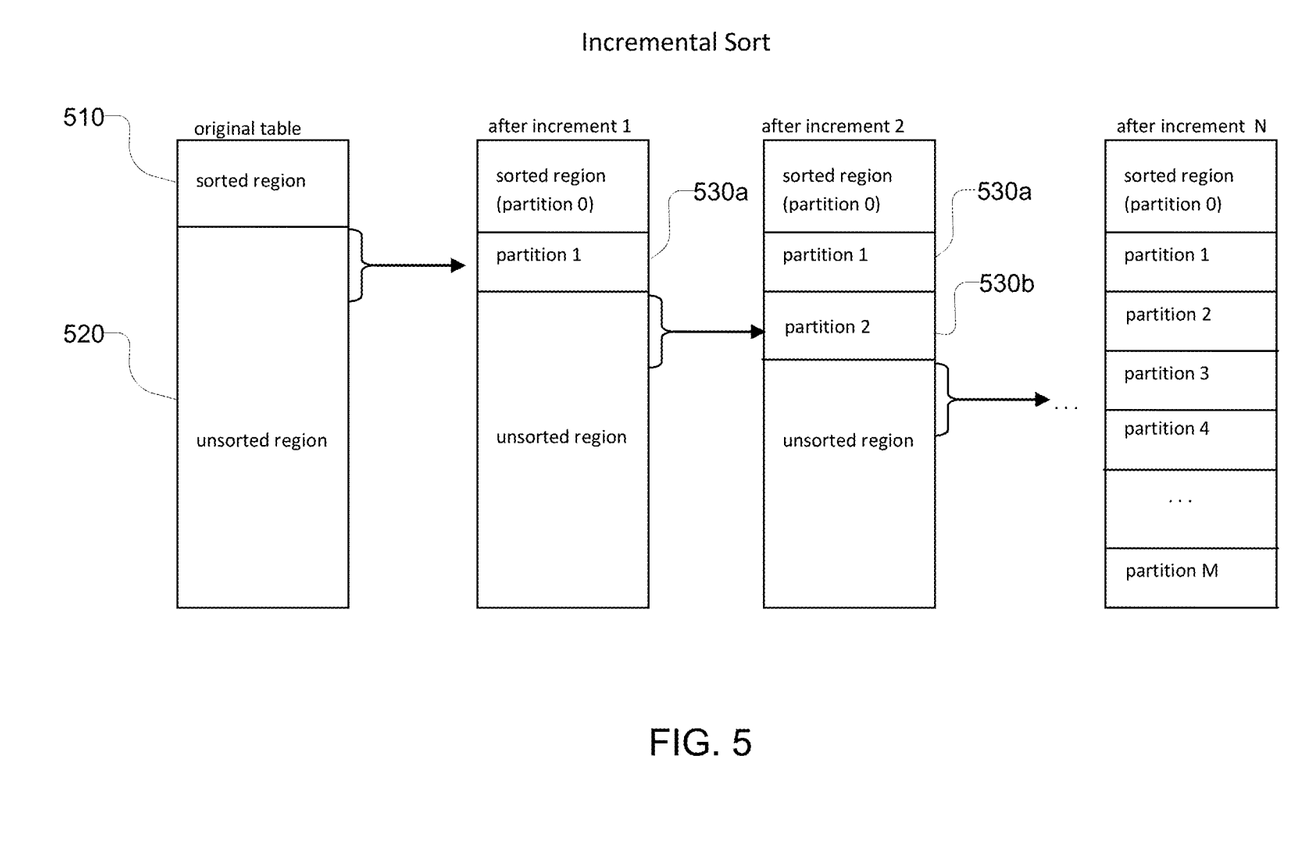
FIG. 5 illustrates the steps of an incremental sort process for maintaining table data in sorted order, in accordance with an embodiment.

FIG. 5 illustrates the steps of an incremental sort process, in accordance with an embodiment. FIG. 5 shows the original table with a sorted region 510 and an unsorted region 520 at the end of the table. The incremental vacuum manager 280 performs increment 1, after which a portion of the unsorted region is sorted and written as partition 530 called partition 1. After increment 2, another portion of the remaining unsorted region is written as partition 2. This process is continued until the unsorted region is divided into a set of partitions each including rows that are sorted within the partition.

Figure 6:
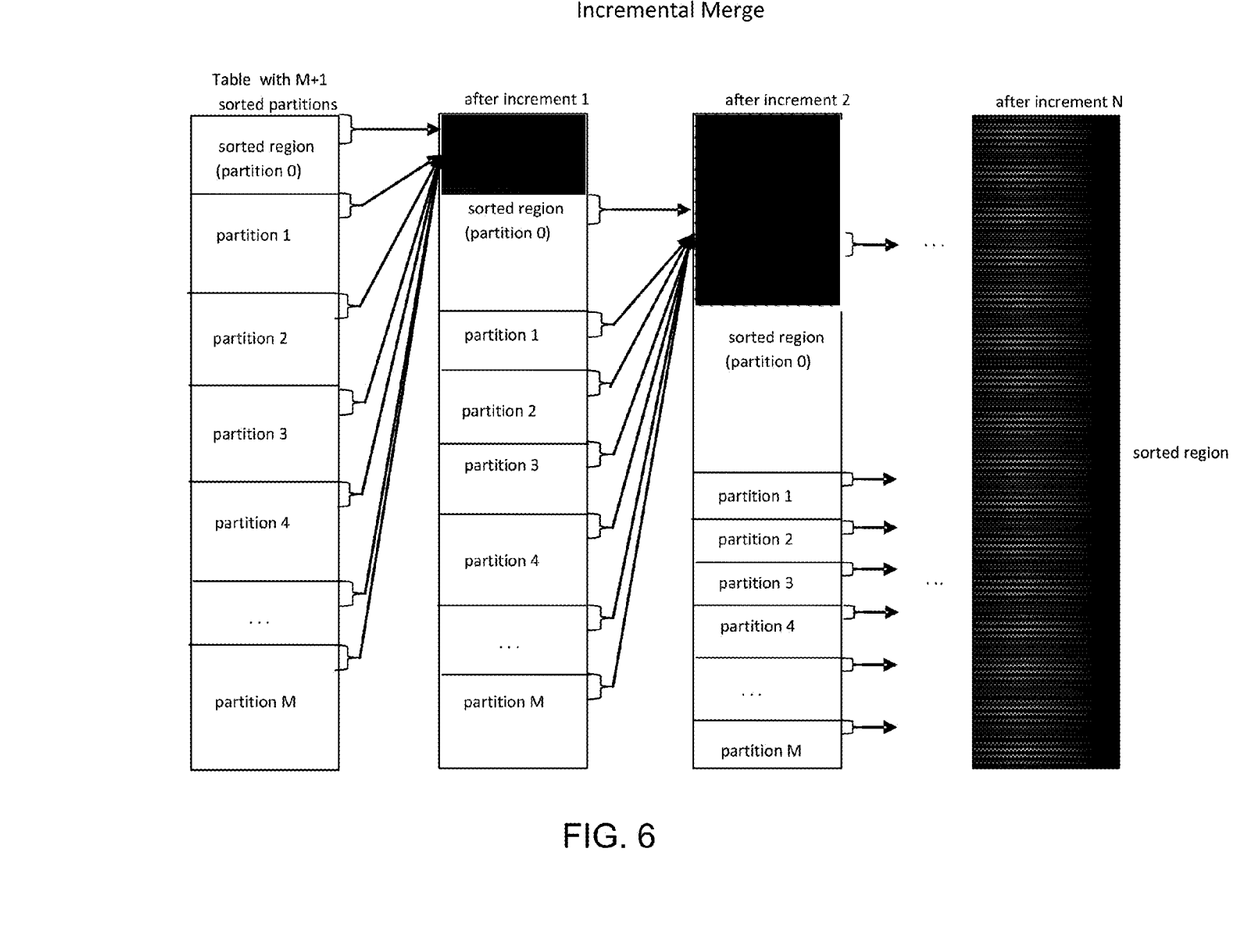
FIG. 6 illustrates the steps of an incremental merge process for maintaining table data in sorted order, in accordance with an embodiment.

FIG. 6 illustrates the steps of an incremental merge process, in accordance with an embodiment. The table is represented as comprising a sorted region and a set of partitions, each partition sorted within itself (as computed by the process of FIG. 5). After increment 1, portions of various partitions are obtained to identify a sorted set of rows that would be obtained of all the partitions from the unsorted region were sorted together. In other words this set of rows corresponds to the lowest ranked rows in the sort order of the table across all partitions. In an embodiment, the set of lowest ranked rows is determined by scanning across partitions to pick the smallest element. The incremental vacuum manager 280 repeats this process to pick the next smallest element and so on until the set of lowest ranked elements is picked. The number of elements in the set may be determined based on a predetermined limit on the size of the set.

Note that this sorted set of rows extracted from various partitions may include rows from some partitions but not from others. For example, if a partition includes rows with large values, the rows from this partition may not be included extracted in increment 1. They are likely to be extracted in a later increment.

The incremental vacuum manager 280 merges the extracted rows with the sorted region in the beginning of the table to compute a sorted region of partition 0, for example, as shown after increment 1. The incremental vacuum manager 280 repeats this process with each increment. With each increment, the next smallest portions of various partitions are extracted to create the next set of lowest ranked rows. The set of rows is merged with the sorted region until all partitions from the unsorted region are exhausted and only the sorted region occupies the entire table as shown in the table after increment N in FIG. 6.

In an embodiment, the incremental vacuum manager 280 performs a database commit operation after writing the set of rows to the sorted region of the staging table. In an embodiment, the incremental vacuum manager 280 maintains a count of the number of rows in the unsorted region to determine whether more iterations are needed. The incremental vacuum manager 280 also keeps track of the last row processed to determine where to perform the extract and merge operation for the next iteration.

In an embodiment, the database is a columnar database that stores the data column wise. In this embodiment, the incremental vacuum manager 280 finds the blocks where a row starts by finding for each column which block contains the row. For example, to merge a sorted set of rows, the incremental vacuum manager 280 finds for each column, the block containing the first row. The incremental vacuum manager 280 scans all following value of the block and inserts the values into the staging table for merging the rows.

In an embodiment, the process uses a priority queue that scans rows from a buffered scanner for each sort group. The process computes the max number of partitions that can be merged since each buffered scanner needs to pin 1 block. If the number of partitions exceeds the disk cache then the process merges as many partitions as it can and then iterates until all the partitions are merged into one.

Figure 7:
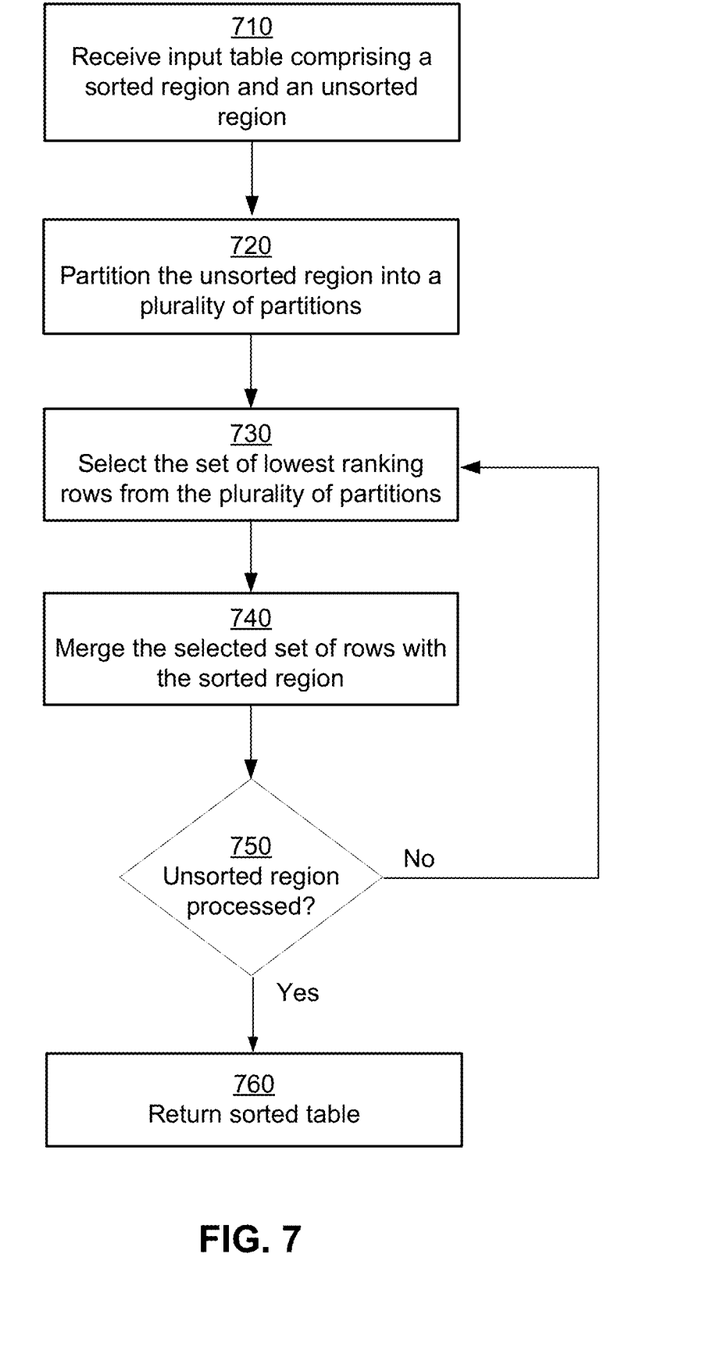
FIG. 7 shows a flowchart illustrating the process of incremental vacuum for maintaining sorted tables, in accordance with an embodiment of the invention.
Figure 8A:
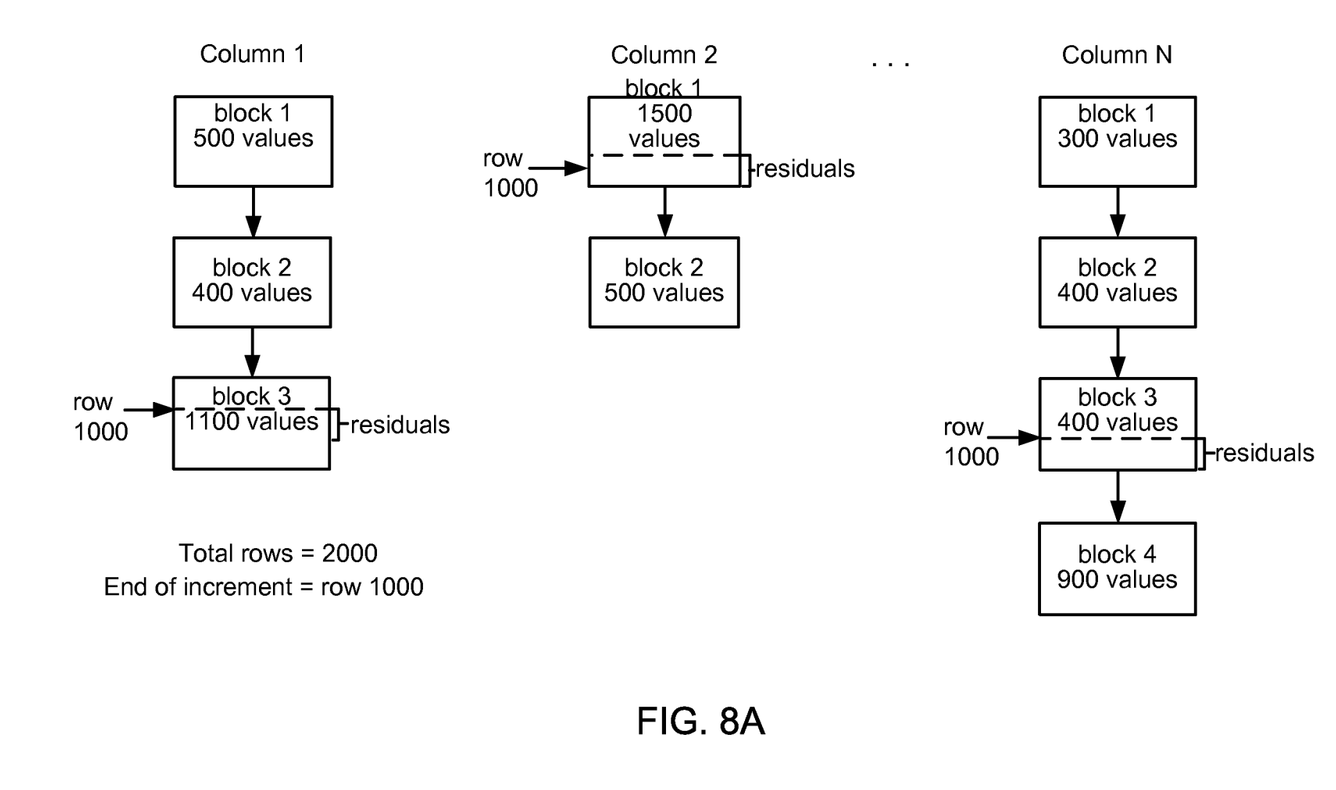
FIGS. 8A-8B illustrate the steps of a process for recompressing residuals in an increment, in accordance with an embodiment.
Figure 8B:
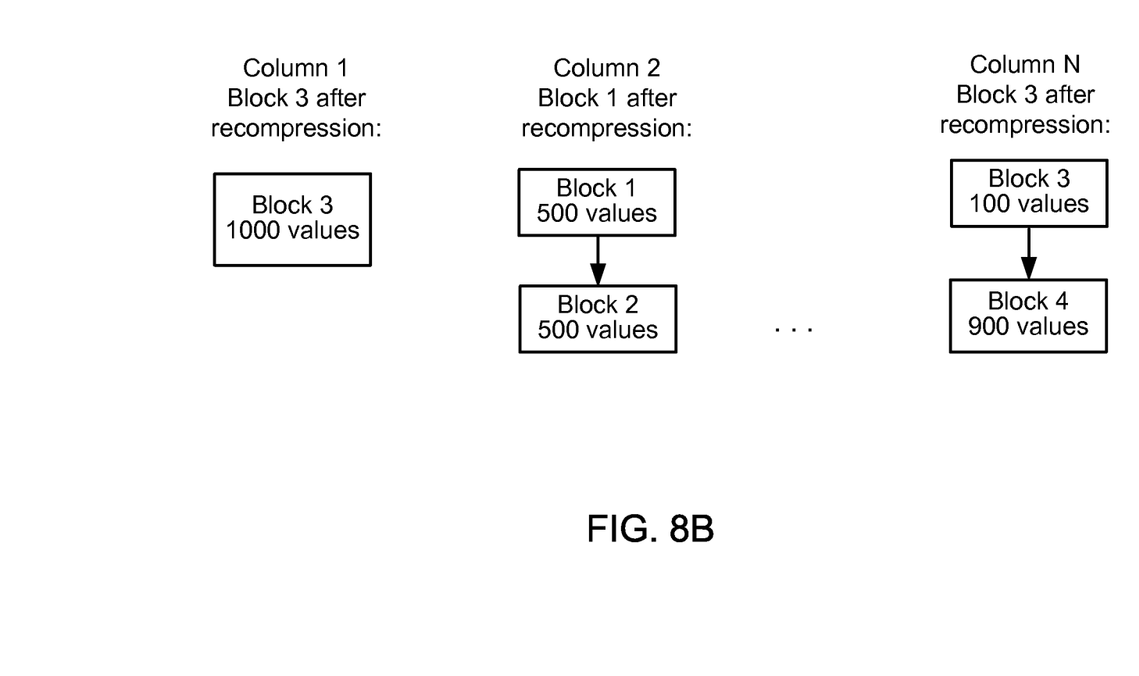

FIG. 7 shows a flowchart illustrating the process of incremental vacuum for maintaining sorted tables, in accordance with an embodiment of the invention. The incremental vacuum manager 280 receives the input table comprising a sorted region followed by the unsorted region. The incremental vacuum manager 280 partitions the unsorted region into a plurality of partitions. Each partition is sorted within itself. In an embodiment, the incremental vacuum manager 280 keeps searching for the smallest element within the unsorted region and adding it to a partition until the partition size reaches a limit. Once the partition becomes too large, the incremental vacuum manager 280 writes the partition to the disk. The incremental vacuum manager 280 then processes the unsorted region to determine the next partition and so on until the entire unsorted region is divided into a plurality of sorted partitions.

The incremental vacuum manager 280 performs the merging of data from these partitions to the sorted region iteratively. The incremental vacuum manager 280 selects 730 a set of lowest ranking rows from the partitions of the unsorted region. The incremental vacuum manager 280 merges 740 the set of lowest ranking rows with the sorted region of the table such that after merging the rows, the sorted region remains sorted. The incremental vacuum manager 280 checks 750 whether there are any more rows remaining in the partitions of the unsorted region. If there are more rows remaining, the incremental vacuum manager 280 repeats the steps 730, 740, and 750 until all rows belonging to the partitions of the unsorted region are processed. If all rows of the unsorted region are processed, the incremental vacuum manager 280 returns 760 the sorted table.

In an embodiment, the incremental vacuum manager 280 adds empty blocks to the end of each column block chain during the initialization of the incremental vacuum process. This is to allow rows to be concurrently added (in the new empty blocks) without affecting the blocks that are being processed by the incremental vacuum. In an embodiment, the incremental vacuum manager 280 splits the blocks on all partition boundaries so each partition starts on a new block. The start/end points of each partition can be determined using the partition row counts from vacuum state.

Residual Recompression

In an embodiment, the database that is performing the vacuum process is a columnar database that stores tables in sorted order. In some embodiments, the database stores the column data in compressed form. Certain additional processing is performed in these embodiments as part of the vacuum process. At end of a vacuum increment (either for incremental delete, sort phase of incremental vacuum or merge phase of incremental vacuum) the blocks of all columns need to be split between the rows that are included in the increment and the residual rows left in the blocks. The residual rows need to be split out into their own blocks to be included in the next increment. With a traditional row based system, the end of a row is the same for all columns. However, for a compressed columnar system each column can have a row fall in a different block and position within that block as all other columns. The vacuum process recompresses the residual rows of an increment by going through each column separately starting from one past the row at which the increment ended, if there is a residual row in the column's block and inserting all remaining rows in that block into a new block in the vacuum staging table. The residual row blocks are included along with the other blocks that were created as parted of the increment when the staging table blocks replace the applicable blocks in the original table.

FIG. 5 illustrates the steps of a process for recompressing residuals in an increment, in accordance with an embodiment. FIG. 5 shows a representation of a table with N columns: column 1, column 2, ... column N in a columnar database that represents the data in sorted form and stores them in compressed form. Since each column may store different type of data that may compress to a different level, each column may occupy different number of blocks for the same number of rows. Furthermore, for a given number of rows the last row may occupy up to a certain position in the last block used to store the set of rows and the remaining block is occupied by what is called the residual data.

For example, if the given set of rows includes 1000 rows, column 1 comprises block 1 that stores 500 values, column 2 stores 400 values, and column 3 stores only 100 remaining values from the set. However the data stored after the column value corresponding to row 1000 is considered residual with respect to this set of rows. Column 2 on the other hand occupies less storage and as a result all the data for the 1000 rows is stored within the first block with some leftover residuals. Similarly, column N stores data for 300 rows in block 1, data for another 400 rows in block 2, and remaining 300 rows in block 3, which leaves a residual of data for 100 rows at the end.

When the data for these 1000 rows is processed, the data from the residuals of each block is written as a new block. Accordingly, a residual block based on remaining data of block 3 from column 1 is written as a new block for column 1 (after compressing the data). A residual block based on remaining data from block 1 of column 2 is written as a new block for column 2 after compressing the data. And a new block comprising residual data from block 3 of column N is written for column N.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method for maintaining sort order of data in a database, the method comprising:
    storing an input table in columnar fashion, wherein the input table is stored as a sorted set of rows followed by an unsorted set of rows;
    partitioning the unsorted set of rows into a plurality of subsets of rows wherein each subset of rows comprises data stored in sorted order within the subset of rows; and
    incrementally merging data from the unsorted set of rows to the sorted set of rows, the incremental merging comprising, iteratively:
        selecting a set of rows from the plurality of subsets of rows, wherein the selected set of rows comprises rows with lowest rank in the sort order across the plurality of subsets of rows;
        for each column, identifying a block corresponding to a last row of the selected set of rows being merged; and
        for each column, storing the rows following the last row of the set of rows from the identified block in a new block, wherein the new block for each column is for processing in the next iteration; and
        merging the selected set of rows with the sorted set of rows.

2. The method of claim 1, further comprising:
    receiving a request to modify the input table; and
    adding a row to the unsorted set of rows based on the request to modify the input table.

3. The method of claim 1, further comprising:
    receiving a request to add a new row to the input table; and
    adding the new row to the unsorted set of rows.

4. The method of claim 1, further comprising:
    receiving a request to delete a row from the sorted set of rows of the input table; and
    marking a storage space of each column of the deleted row in the sorted set of rows as unused.

5. The method of claim 1, further comprising:
    receiving a request to update a row from the sorted set of rows of the input table;
    deleting the row from the sorted set of rows, the deleting comprising, marking a storage space of each column of the deleted row in the sorted set of rows as unused; and
    adding the updated row to the unsorted set of rows.

6. The method of claim 1, further comprising:
    storing the merged sorted set of rows in a staging table, wherein responsive to verifying that there are no rows remaining in the plurality of subsets of rows, indicating that the staging table comprises data of the input table in sorted order.

7. The method of claim 1, wherein merging the selected set of rows with the sorted set of rows comprises ignoring any deleted rows in the input table while storing the merged sorted set of rows.

8. A non-transitory computer-readable storage medium storing computer-executable code for maintaining sort order of data in a database, the code, when executed by a processor, causing the processor to:
    store an input table in columnar fashion, wherein the input table is stored as a sorted set of rows followed by an unsorted set of rows;
    partition the unsorted set of rows into a plurality of subsets of rows wherein each subset of rows comprises data stored in sorted order within the subset of rows; and
    incrementally merge data from the unsorted set of rows to the sorted set of rows, the incremental merging comprising, iteratively:
        select a set of rows from the plurality of subsets of rows, wherein the selected set of rows comprises rows with lowest rank in the sort order across the plurality of subsets of rows;
        for each column, identify a block corresponding to a last row of the selected set of rows being merged; and
        for each column, store the rows following the last row of the set of rows from the identified block in a new block, wherein the new block for each column is for processing in the next iteration; and
        merge the selected set of rows with the sorted set of rows.

9. The computer-readable storage medium of claim 8, wherein the code further causes the processor to:
    receive a request to modify the input table; and
    add a row to the unsorted set of rows based on the request to modify the input table.

10. The computer-readable storage medium of claim 8, wherein the code further causes the processor to:
    receive a request to update a row from the sorted set of rows of the input table;
    delete the row from the sorted set of rows, the deleting comprising, marking a storage space of each column of the deleted row in the sorted set of rows as unused; and
    add the updated row to the unsorted set of rows.

11. A computer-implemented system for maintaining sort order of data in a database, the system comprising:
    a computer processor; and a non-transitory computer-readable storage medium storing computer program modules configured to execute on the computer processor, the computer program modules comprising:
a vacuum process manager configured to:
store an input table in columnar fashion, wherein the input table is stored as a sorted set of rows followed by an unsorted set of rows region;
partition the unsorted set of rows into a plurality of subsets of rows wherein each subset of rows comprises data stored in sorted order within the subset of rows; and
incrementally merge data from the unsorted set of rows to the sorted set of rows, the incremental merging comprising, iteratively:
select a set of rows from the plurality of subsets of rows, wherein the selected set of rows comprises rows with lowest rank in the sort order across the plurality of subsets of rows;
for each column, identify a block corresponding to a last row of the selected set of rows being merged; and
for each column, store the rows following the last row of the set of rows from the identified block in a new block, wherein the new block for each column is for processing in the next iteration; and
merge the selected set of rows with the sorted set of rows.

12. The computer-implemented system of claim 11, wherein the vacuum process manager is further configured to:
receive a request to modify the input table; and
add a row to the unsorted set of rows based on the request to modify the input table.

13. The computer-implemented system of claim 11, wherein the vacuum process manager is further configured to:
receive a request to update a row from the sorted set of rows of the input table;
delete the row from the sorted set of rows, the deleting comprising, marking a storage space of the deleted row in the sorted set of rows as unused; and
add the updated row to the unsorted set of rows.

* * * * *